Figure 7:
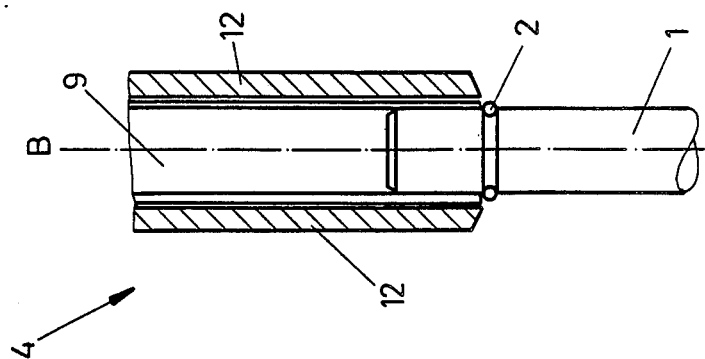

United States Patent [19]

Kumeth

[11] Patent Number: 4,703,548
[45] Date of Patent: Nov. 3, 1987

[54] APPARATUS FOR FITTING O-RINGS ONTO WORKPIECES

[76] Inventor: Siegmund Kumeth, Bayreuther Strasse 37, 8450 Amberg, Fed. Rep. of Germany

[21] Appl. No.: 885,472

[22] Filed: Jul. 14, 1986

[30] Foreign Application Priority Data

Jul. 20, 1985 [DE]  Fed. Rep. of Germany ....... 3526081
Jul. 26, 1985 [DE]  Fed. Rep. of Germany ....... 3526768

[51] Int. Cl.[4] ............................................. B23P 19/02
[52] U.S. Cl. ..................................................... 29/235
[58] Field of Search ................. 29/235, 282, 717, 809

[56] References Cited

U.S. PATENT DOCUMENTS 3,605,239  9/1971  Eschholz ............................... 29/235

*Primary Examiner*—Robert C. Watson
*Attorney, Agent, or Firm*—Jacobs & Jacobs

[57] ABSTRACT

An apparatus for fitting O-ring onto workpieces employs a spreading tool for spreading an O-ring and a receiver tool for receiving a spread O-ring that operate to transfer the O-ring from the spreading tool to the receiver tool without relative movement between the O-ring and the spreading tool and the receiving tool in the direction perpendicular to the face of the O-ring, whereby overstretching and distortion of the O-ring are both avoided.

20 Claims, 10 Drawing Figures

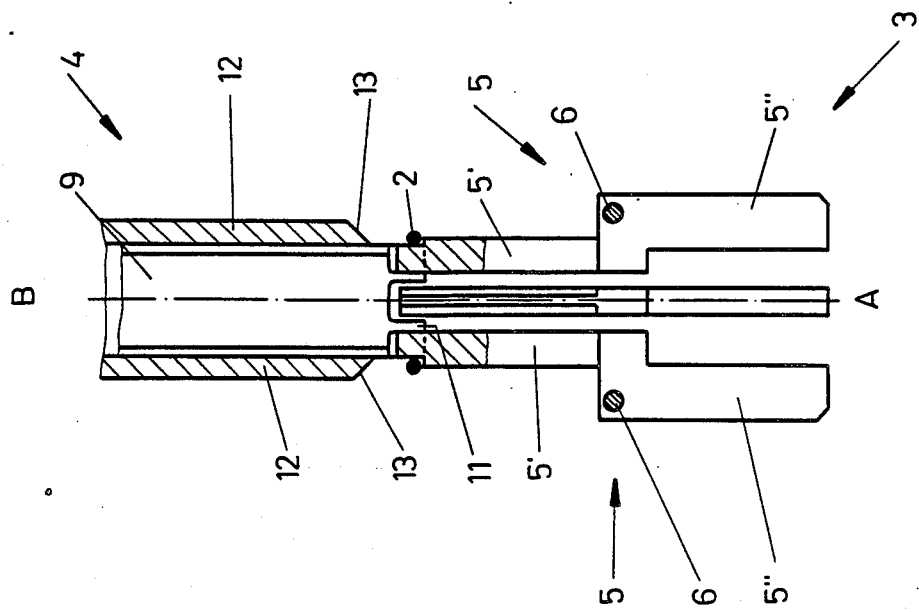
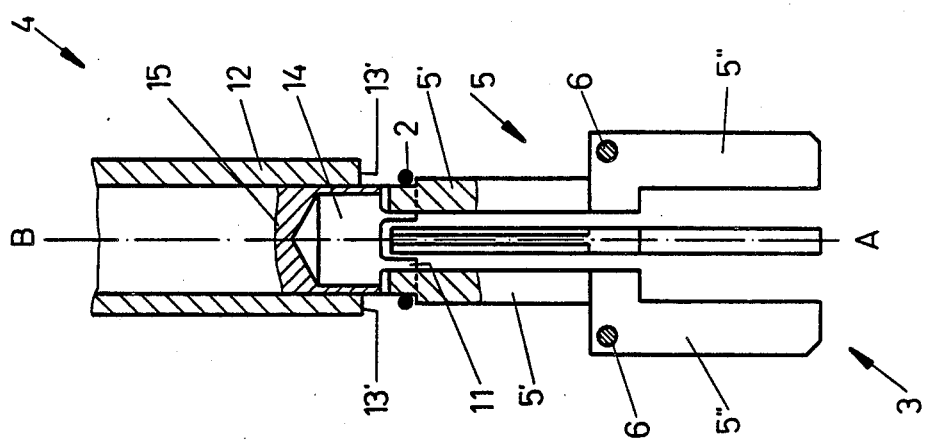

APPARATUS FOR FITTING O-RINGS ONTO WORKPIECES

The invention relates to an apparatus for fitting workpieces onto workpieces in particular cylindrical workpieces.

In the production of equipment or parts of equipment it is frequently necessary to place onto workpieces O-rings which are usually used as sealing rings and are made of rubber or some other flexible material. In order for these rings to be able to fulfil satisfactorily their ultimate function, for example as sealing rings, it is necessary to fit the rings as carefully as possible, i.e. in particular to avoid overstretching them during the fitting process.

When fitting O-rings onto workpieces, particular care must also be taken that these rings do not roll along on the surface of the workpiece when they are pushed thereonto.

Hitherto, no apparatus were available on the market which allowed O-rings to be fitted automatically and carefully onto workpieces and which, in particular in this connection, also allowed them to be fitted without the O-rings rolling along on the surface of the workpiece when pushed thereonto or fitted thereto.

The invention is based on the object of disclosing an apparatus which allows O-rings to be fitted automatically and carefully onto workpieces, in the case of which the rolling-along of the O-ring on the surface of the workpiece in question when being pushed on or fitted thereto is effectively prevented.

In order to achieve this object, an apparatus is constructed according to the characterising part of claim 1.

The O-ring to be fitted to a workpiece is firstly delivered to the spreader tool which, together with the transfer tool, forms the two essential operating components of the apparatus, namely in such a way that the contact surfaces of the spreader elements, in their rest position, lie within the opening of the O-ring. Subsequently, the spreader elements are moved into their operating position, as a result of which the O-ring at the first contact surface of the spreader element is expanded as a result of elastic deformation of its material but not beyond a permissible extent nor exceeding the limits of elasticity. The O-ring expanded in this way is then transferred to the transfer too, namely in such a way that the inner face of the O-ring, which continues to be stretched, abuts against the second contact surface, formed by the segments of the receiver element of the transfer tool. The transfer occurs in this case in order that, after the O-ring has been expanded by the spreader elements, the spreader tool and the transfer tool are guided into one another in the direction of the first and second axes, respectively, in such a way that each first contact surface of the spreader elements of the spreader tool—which elements are in the operating position—lies between two adjacent segments of the receiver element of the transfer tool, in this position (2nd position) of the spreader tool and transfer tool, characterising the transfer situation, the second contact surfaces lying preferably somewhat radially inside the first contact surfaces, such that it is possible for the segments of the transfer tool, that is the second contact surfaces formed by these segments, to be introduced into the aperture of the expanded O-ring, without coming into contact with this ring. By returning the spreader elementsor the first contact surfaces, formed thereby, into the rest position, the O-ring is then placed on the receiver element, namely immediately adjacent the end of the said element.

In order for the O-ring to be definitively transferred to the workpiece, the receiver element is pushed onto the said workpiece, or, conversely, the workpiece is pushed into the receiver element, namely in both cases in such a way that the end of the receiver element lies immediately adjacent the location of the workpiece, onto which location the O-ring is to be placed. With the assistance of the slide provided on the receiver element, the O-ring is then pushed downwards from the receiver element, the O-ring merely jumping over the edge at the end of the receiver element onto the workpiece and thus not being able to roll or curl up on any surface even during this transfer process.

The apparatus according to the invention also has the particular advantage that the receiver element or the part, of this receiver element, comprising the segments, can be constructed such that it is very thin-walled since the O-rings, which have already been spread or expanded by the spreader tool, are delivered to the receiver element. As a result of the thin-walled construction of the receiver element it is in particular possible to keep small the degree of expansion required for fitting an O-ring onto a workpiece.

Further developments of the invention are the subject of the subclaims.

Figure 3:
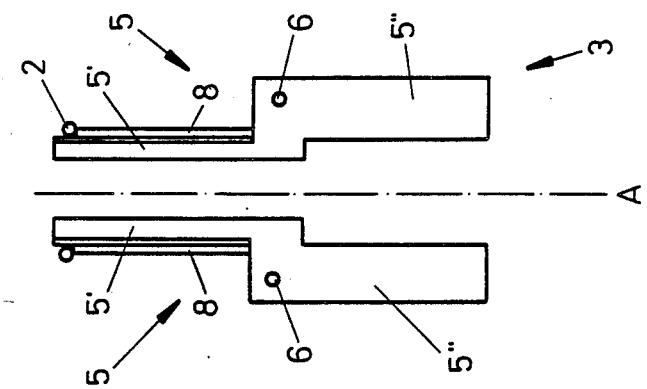
Figure 1:
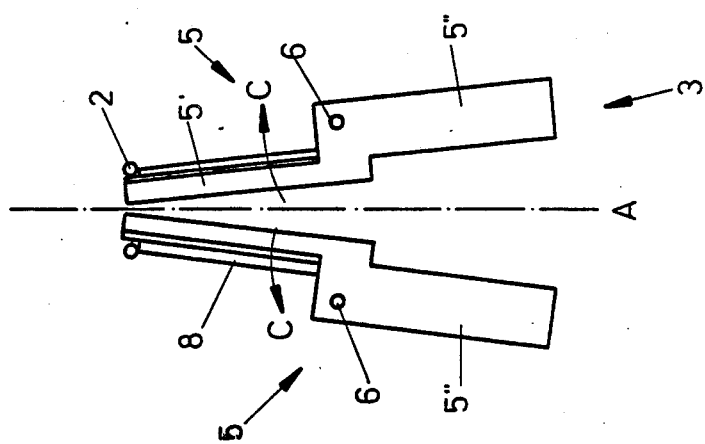
Figure 4:
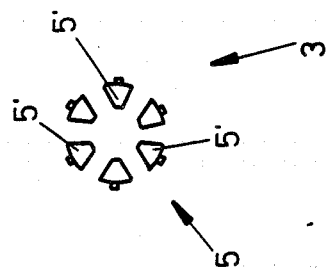
Figure 9:
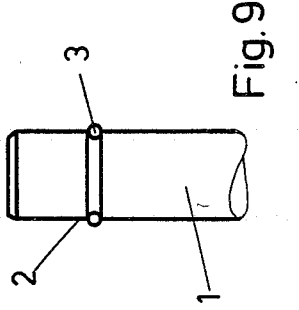
Figure 2:
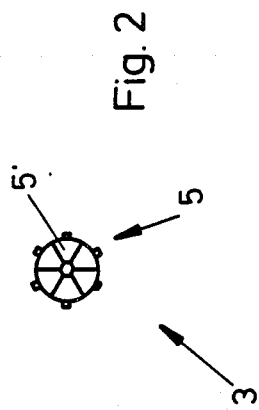
Figure 6:
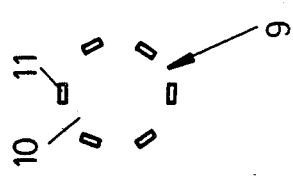
Figure 8:
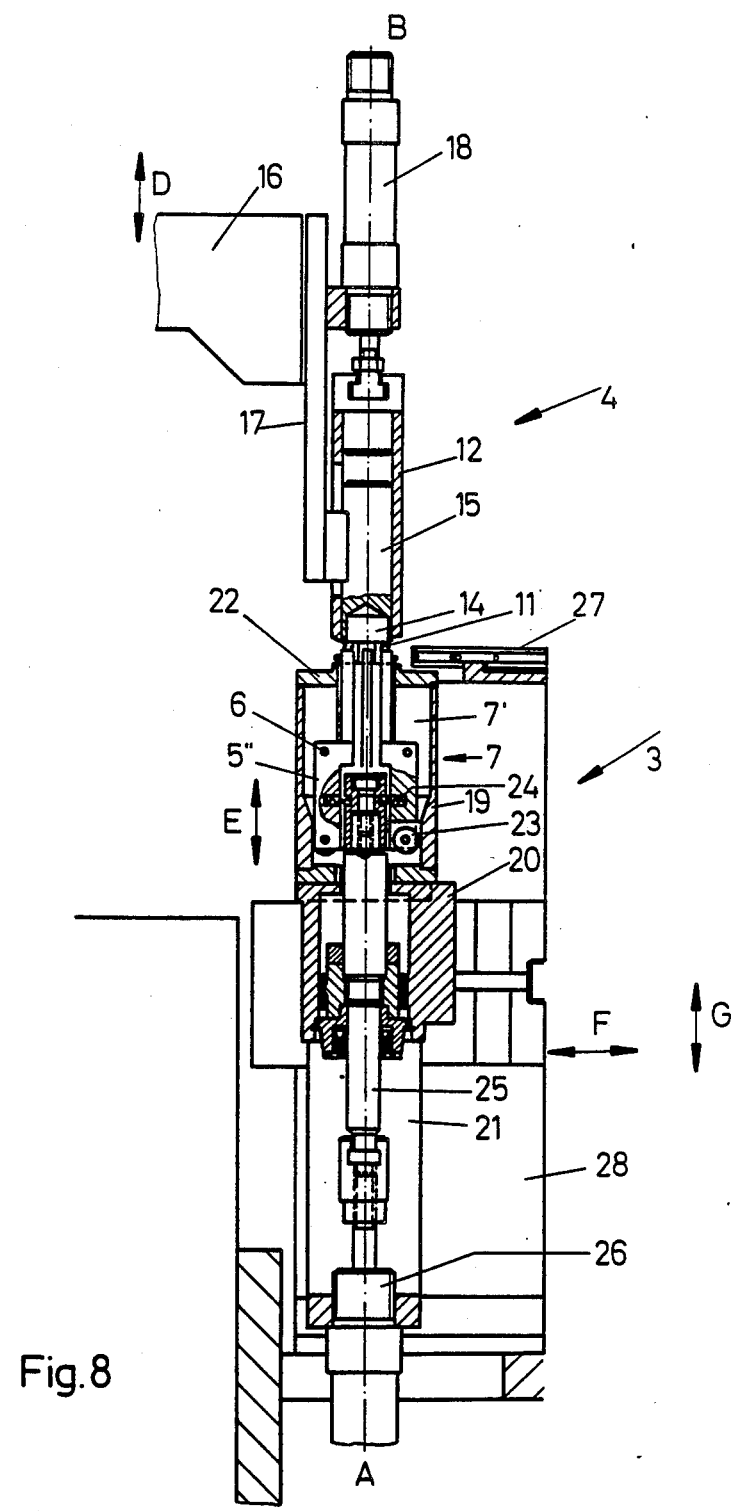

In the following the invention will be described by way of an embodiment in further detail with reference to the Figures, in FIG. 1: shows a schematic representation in side view of two spreader elements, of the spreader tool, constructed as pivotable spreader arms, of an apparatus according to the invention, with the spreader arms in the rest position;

FIG. 2: shows schematically a plan view of the upper end, of the spreader arms, of the spreader element, forming the contact surfaces of the spreader element, with the spreader arms in the rest position;

FIGS. 3 and 4: shows similar views to FIGS. 1 and 2 but with the spreader arms in the operating position;

FIG. 5: shows schematically and in longitudinal section, the receiver element of the transfer tool, together with a schematic representation of the spreader tool during the transfer of an O-ring, spread open by the spreader arms, to the receiver element of the transfer tool (transfer situation);

FIG. 6: shows the receiver element of the transfer tool viewed from the end which is the lower in FIG. 5;

FIG. 7: shows, in a similar representation to FIG. 5, the receiver element of the transfer tool, however, in the case of a receiver element pushed onto a workpiece, shortly after an O-ring has been fitted onto the workpiece, which is formed as a shaft;

FIG. 8: shows a longitudinal section through the spreader tool and through the transfer tool in the transfer situation;

FIG. 9: shows in a single representation and in lateral view, the workpiece provided with an O-ring;

FIG. 10: shows in a similar representation to FIG. 5 the spreader tool and the transfer tool of the apparatus according to FIG. 8, however in the case of a slide which does not have a bevelled surface.

In the Figures, 1 is a workpiece in the form of a shaft onto which an O-ring 2, serving as a seal, for example, and made of rubber or rubber-like material, is to be placed in such a way that, after it has been fitted, the axis of this O-ring lies on the same axis as shaft 1 and is partially accommodated by an annular groove provided in the peripheral surface of shaft 1, as shown in FIG. 9.

An apparatus, essentially consisting of a spreader tool 3 and a transfer tool 4 (FIG. 8), is used to place the O-ring 2 onto the shaft 1. The essential component of these tools and their functions are shown in FIGS. 1 to 7. In the illustrated embodiment the spreader tool comprises six spreader arms 5, which are disposed such that they are uniformly distributed about an axis A and the longitudinal extension of which lies in the direction of this axis. The central area of each spreader arm 5 is pivotably mounted by means of an articulated pin 6 in a support element 7 (FIG. 8) which is common to all the spreader arms 5, the axis of the articulated pin 6 of each spreader arm 5 lying perpendicular to the axis A and also perpendicular to a line extending radially to this axis.

The lengths 5' of the spreader arms 5, which in FIGS. 1 and 3 lie above the articulated pin 6, are bent in a convex or circular manner at their outer surface, in such a way that these outer faces of all the spreader arms or lengths 5' lie on a common circular line extending concentrically to the axis A when the spreader tool 3 or spreader arms 5 (FIGS. 3 and 4) are in the operating position. On the convexly bent outer surfaces, the spreader arms 5 are further provided in the region of lengths 5' with a bar-like projection 8 extending in the direction of the longitudinal extension of the associated spreader arm 5 or its length 5', the end, which is the upper end in FIGS. 1 and 3, of each projection 8 terminating at a distance from the upper end there of lengths 5' of the associated spreader arm 5 and thus forming a vertical deposit surface for the O-ring 2 which has been grasped and expanded by the spreader arms 5. The area of the convexly curved outer face of each spreader arm 5 or the length 5' thereof, —which area is the upper area, free from projection 8 in FIGS. 1 and 3—forms a contact surface, against which the inner surface of the 0-ring 2, which has been taken up and spread by the spreader tool, abuts.

The transfer tool has a receiver element 9 which is formed as a thin-walled tubular member with a circular outer or peripheral surface and with a likewise circular inner surface. On its outer face the receiver element 9 has a cross-section which is approximately the same size as or slightly smaller than the diameter of the circular line, on which the outer faces of the upper end of the spreader arms 5, i.e. the contact surfaces of these spreader arms, are disposed when the spreader arms are in their operating position. Furthermore, at one end, i.e. in the illustration selected for FIG. 5 the lower end, the receiver element is provided with recesses 10 which extend in the direction of axis B of this element and which are open towards this end of the receiver element. The number of recesses 10 is selected in such a way that, at the lower end of the receiver element, between the recesses, six segments 11 are produced, each of which is formed by the peripheral wall of a hollow cylinder, i.e. by the remaining section in each case of the peripheral wall of the tubular receiver element, the total of these segments 11 forming, with their outer surfaces, an annular contact surface which is interrupted in the region of the recesses 10 and against which the inner surface of O-ring 2, transferred to the transfer element, abuts. The lower end of the receiver element is formed in a crown-like manner by the recesses 10 and the segments 11. The segments 11 and the recesses 10 forming these segments are furthermore disposed and constructed in such a way that when the spreader arms 5 are in the operating position, one segment 11 in each case is located between two adjacent spreader arms and the upper ends of the lengths 5' of the spreader arms 5 in each case find space in a recess 10 or the outer peripheral surfaces, formed at the top end, can project slightly radially outwards beyond the second contact surface formed by the outer face of the segments 11, if, as is shown in FIG. 5, the axes A and B of both tools are disposed on the same line and the tools are moved relative to one another into the transfer position.

There is disposed on the peripheral surface of receiver element 9 a slide 12 which is constructed in the manner of a casing and the end face of which, adjacent the lower end of the receiver element 9, forms a further contact surface 13, which, moreover, is constructed in a bevelled manner or in the manner of a truncated cone, in such a way that the radially inwardly lying area of this contact surface 13 lies closer at the lower end than the radially outwardly lying area. By means of this slide 12, the contact surface 13 of which is disposed at a distance from the lower end of the receiver element 9, when the slide is in the rest position, and which slide 12 can be displaced out of this rest position downwards at least to such an extent that the contact surface 13 is at the same level as the lower end of the receiver element 9, the O-ring, retained on the segments 11, can be pushed onto the workpiece or shaft 1, as will be described in greater detail hereinafter, the bevel of the contact surface 13 preventing the O-ring 2 from twisting or rolling along on the workpiece when the said O-ring is pushed onto the workpiece or shaft 1.

In the case of the embodiment of the apparatus illustrated in detail in FIG. 8, the tubular receiver element 9 is formed by the lower end of a rod 15, having a circular cross-section, which end is provided with a blind hole 14.

The fitting of an O-ring 2 onto the shift 1 occurs by means of the apparatus shown in principle in FIGS. 1 to 7 in the following manner:

The O-ring 2 is firstly brought by means of a delivery device into the region of the spreader tool 3 in such a way that the annular face of the O-ring 2 lies perpendicular to the axis A of the spreader tool 3, the spreader arms of which are in the rest position shown in FIG. 1. If the O-ring 2 is not delivered directly to the spreader tool 3 in such a way that the first contact surfaces—of the spreader arms 5—formed at the upper end of lengths 5' extend into the aperture of the O-ring 2, this is achieved after the O-ring 2 has been delivered into the operating area of the spreader tool 3 as a result of a corresponding movement of this tool.

As soon as the first contact surfaces of the spreader arms 5, formed at the upper end of their lengths 5', extend into the aperture of the O-ring 2, or this ring is supported downwardly at the upper ends of the projections 8, as is shown in FIG. 1, the spreader arms 5 are pivoted about their articulated pin 6 in such a way that the lengths 5' move radially outwardly with respect to the axis A, as is indicated by arrows C in FIG. 1. It is understood that in this connection, all the spreader arms are pivoted radially outwards simultaneously and to the same extent (arrow C). As a result thereof, the O-ring 2 is expanded in a careful manner as a result of elastic deformation until the spreader arms 5 have reached the operating position illustrated in FIG. 3.

In the meantime, the transfer tool 4 has moved into a position in which the axis B of the receiver element 9 is the same as axis A, however, the lower end of the receiver element 9 is still disposed at a distance from the upper end of the spreader arms 5 or their lengths 5'. Subsequently, the spreader tool 3 or the part thereof comprising the spreader arms 5, and the receiver element 9 together with the slide 12, located thereon, are moved in the direction of axes A and B relative to one another in such a way that each segment 11, formed at the lower end of the receiver element 9, enters from above into the space between two lengths 5' of the spreader arms 5 which are in the operating position or, conversely, each length 5' of the spreader arms 5 which are located in the operating position, enters from below into a recess 10 of the receiver element 9. Since the first contact surfaces, which are formed by the outer faces of the lengths 5' and against which the O-ring 2 abuts, are disposed, in the operating position, or when the spreader arms 5 are spread apart, on a circular line which has a slightly larger diameter than the outer diameter of the receiver element 9, the expanded O-ring is pushed over the segments 11 or the second contact surfaces formed by these segments. This situation or position of the tools 3 and 4, which is also called the transfer situation, is shown in FIG. 5. Subsequently, the spreader arms 5 are pivoted back towards arrows C into their rest position, such that the inner face of the O-ring 2 abuts against the outer faces of the segments 11, i.e. against the second contact surfaces, formed by these outer faces in the region of the lower end of the receiver element 9. The spreader tool 3 and the transfer tool 4 are then moved apart from one another, relative to one another, in the direction of axes A and B respectively. Subsequently, as a result of a pivoting or rotating movement with a subsequent movement in the direction of arrow B, the receiving element 9, together with the slide 12 and the expanded O-ring 2, retained at the lower end of the receiver element, is pushed onto the shaft 1, so that the lower end of the receiver element 9 lies immediately adjacent the groove provided in shaft 1, into which groove the O-ring 2 is to be introduced. The slide 12 is now moved in the direction of axis B, relative to the receiver element 9, as a result of which, with the assistance of the contact surface 13, the O-ring is pushed from the segments 11 into the groove provided at the periphery of the shaft 1 and is seated firmly therein as a result of elastic return deformation of the material on shaft 1.

The apparatus, the construction and function of which are described in principle in connection with FIGS. 1 to 7, enables the O-ring 2 to be placed very carefully onto the shaft 1 in a fully mechanical manner, in particular also, without the risk of the O-ring 2 being over-stretched and also without the risk of the O-ring 2 rolling along on the peripheral surface when it is placed on the shaft 1 and thus being seated in a twisted or distorted manner in the groove in the shaft 1. Both would essentially impair the efficient functioning of the O-ring, for example as a seal.

The fact that the expanded O-ring 2 is carefully transferred from the spreader tool 3 to the transfer tool 4 and that, as a result of the tubular construction of the receiver element 9, the latter can be pushed onto the shaft 1 to such an extent that the O-ring 2, seated on the outermost lower end of the receiver element 9 or segments 11, only has to be displaced a very small amount, by means of the sloping surface 13, which prevents the said ring rolling on segments 11, in order to reach or jump into the annular groove, in shaft 1, lying immediately at the free end of the segments 11, are also essential in the case of the apparatus described.

The apparatus is shown in greater detail in FIG. 8. In this Figure, 16 is one end of a support arm which extends in a horizontal direction and can be moved up and down in a vertical direction, i.e. in a direction parallel to the axis B of the receiver element 9 formed by the lower end of the rod 15, as is indicated by the double arrow D. At the end 16 there is secured a side plate 17 which, on the one hand, supports a pneumatically operated piston-cylinder device 18 and, on the other hand, holds the rod 15 firmly.

The spreader tool 3 consists essentially of a piece of apparatus which is composed of a plurality of elements 19, 20 and 21, element 19 of which being constructed as a casing-like body with a cross-section which narrows towards the lower end and in which element the support element 7 is disposed so as to be able to slide in the direction of axis A. The support element 7 consists in this embodiment of a plurality of segments 7', secured at the upper side to a plate 22, one spreader arm 5 being disposed between two segments 7' in each case such that it can pivot by means of the articulated pin 6. At the lower end of the lengths 5", provided below the articulated pin 6, there is provided on each spreader arm 5 in each case one roller 23, which abuts against the inner face of the element 19 which is in the form of a casing. Furthermore, there is associated with each spreader arm 5 a compression spring 24, one end of which acts on the lower lengths 5" of the spreader arm 5 in question and prestresses the said spreader arm 5 in its rest position (FIG. 1). All the compression springs 24 are supported at their other end in the central region of the support element 7. The support element 7 is connected via a coupling rod 25, whose axis is the same as axis A of the spreader tool 3, to the piston of a pneumatically operated piston-cylinder device 26, which is retained at the lower end of the element 21 which is constructed in the manner of an angular arm. By means of the piston-cylinder device the support element 7 can thus be moved in a reciprocating manner relative to the element 19, constructed as a casing, in the direction of axis A, as is indicated by the double arrow E, the rollers 23, when the support element 7 is displaced downwards, coming to rest with the inner face of the section—of element 19—which is reduced in cross-section, as a result of which the spreader arms 5, or the upper lengths 5' thereof, pivot radially outwards against the effect of the compression springs 24 into their operating position. This operating position is reached when the plate 22, which has in its central region an opening, through which the upper ends of the spreader arms 5 outwardly project, lies with its lower side abutting against the upper edge of the element 19 formed in the manner of a casing. When the support element 7 is displaced upwards by means of the piston-cylinder unit 26, the rollers 23 finally lie against the inner face of the region of the element 19 with the largest internal cross-section, as a result of which the spreader arms 5 are pivoted by the compression springs 24 into their rest position.

In the embodiment shown in FIG. 8 the O-rings 2, which are to be fitted onto the workpiece or shaft 1, are delivered via a conveyer device 27 constructed as a linear conveyer, the first O-ring 2 at the end of this conveyer device 27 in the conveying direction in each case, being placed or brought onto the upper ends of the lengths 5' of the spreader arms 5, which are in the rest position. This may occur either by means of a gripping or transfer device, shown in greater detail in FIG. 8 or, for example, as a result of the fact that the entire spreader tool 3 is guided movably on the machine frame in a horizontal direction and a vertical direction, as indicated by the double arrows F and G, such that when the spreader arms 5 are in the rest position, that is when the upper ends of the lengths 5' are pivoted inwards, the upper ends of the lengths 5', of the spreader arms 5, can be introduced from below into the first O-ring 2 waiting ready at the end of the conveyer device 27, after a corresponding lowering (in a vertical direction) and corresponding displacement in a horizontal direction. Subsequently, the entire spreader tool 3 is moved back into the position shown in FIG. 8, the support element 7 being moved downwards relative to the element 19 simultaneously or subsequently in order to expand the O-ring taken up by the spreader arms 5. Subsequently, the transfer tool 4 is moved downwards in the direction of arrow D, such that the segments 11, formed at the lower end of the receiver element 9, are inserted in the intermediate spaces formed between the upper lengths 5', of the spreader arms 5, which are in the rest position, and thus also in the opening of the expanded O-ring 2, in the manner described above. In order, finally, to be able to fit the expanded O-ring 2, which is held on the receiver element 9, onto the workpiece or shaft 1, the arm comprising end 16 can be pivoted together with the transfer tool 4 about a vertical axis, for example, into a position in which the receiver element 9 is located above the workpiece (shaft 1) which is then lying on the same axis as axis B, such that, firstly, by lowering the entire transfer tool 4, or by pushing the receiver element 9 onto the shaft 1 and subsequently displacing the slide 12 (by operating the piston-cylinder unit 18), the O-ring is inserted, in the manner described above, into the groove in the shift 1.

It is, of course, possible to perform the fitting operation of the O-ring onto the spreader tool and the relative movements necessary for transferring the expanded O-ring from the spreader tool 3 to the transfer tool 4 and from the latter to the workpiece (shaft 1) in a way other than that described. As has been shown in detail, it depends essentially upon the method of operation and the construction of the entire apparatus (automatic assembly machine), in which entire apparatus the apparatus for fitting O-rings onto workpieces is to be used.

In the case of the embodiment illustrated in FIG. 10, the slide 12 comprises an annular contact surface 13', which, in contrast to the contact surface 13, is not bevelled, but lies in a plane perpendicular to axis B. This construction is possible when there is no fear of the O-ring rolling along when fitted onto the workpiece, if the surface of the workpiece is suitably constructed.

I claim:

1. Apparatus for fitting O-rings onto workpieces, in particular onto cylindrical workpieces, wherein the O-rings are delivered via a delivery with the annular faces of the O-rings lying in a defined plane, the improvement which comprises a spreader tool which has at least three spreader elements, each spreader element forming a first contact surface for the inner surface of an O-ring; the first contact surfaces being disposed such that they are distributed about a first axis extending perpendicular to said plane and are movable radially outwards from a standby position at a slight distance from said axis to an operating position at a greater distance from said axis; a transfer tool provided with a receiver element which is formed with segments at one end, said segments being disposed about a second axis, said segments being formed as a wall section of a hollow cylinder, and said segments, on their outer faces, each forming a second contact surface for the inner surface of an O-ring; said receiver element having recesses formed between two adjacent segments of said receiver element and being open towards the end of the receiver element, the number of said recesses being equal to the number of the first contact surfaces formed by the spreader elements; the spreader tool and the transfer tool being operable to be moved from a first position in which the first and second axes lie on the same axis in relation to one another in the direction of these axes relative to one another to a second position in which each segment of the receiver element is disposed in the intermediate space formed between two adjacent first contact surfaces of the spreader elements located in the operating position; and a slide forming a third lateral contact surface for an O-ring displaceably disposed on the outer surface on the receiver element.

2. Apparatus according to claim 1, wherein the third contact surface extends transversely to the second axis.

3. Apparatus according to claim 1, wherein the receiver element is formed by a tubular member or an element constructed in the manner of a tube and is provided at one end with said recesses which are open towards this end.

4. Apparatus according to claim 1, wherein the recesses of the receiver element are slots.

5. Apparatus according to claim 1, wherein the receiver element can be pushed onto the workpiece.

6. Apparatus according to claim 1, wherein the spreader elements are each spreader arms which are mounted on a support element so as to pivot about a pivot-axis which is disposed perpendicular to said first axis and perpendicular to a line extending radially with respect to the first axis.

7. Apparatus according to claim 6, wherein the spreader arms are each formed as a double-ended lever having two lengths extending from said pivot-axis, with each double-ended lever forming with outer face at the end of one length the first contact surface.

8. Apparatus according to claim 7, wherein the other length of each spreader arm co-operates with an element provided with a cam for obtaining the pivot movement of the spreader arm.

9. Apparatus according to claim 8, wherein the element forming said cam is a casing in which the support element is displaceably disposed and which has an area with a larger cross-section and an area with a smaller cross-section.

10. Apparatus according to claim 1, wherein the third contact surface is formed as an annular surface projecting radially outwards beyond the outer surface of the receiver element such that the radially inwardly lying area of this surface is closer to the end of the receiver element than the radially outwardly lying area.

11. Apparatus according to claim 10, wherein the third contact surface is a conically shaped surface.

12. In an apparatus for fitting O-rings onto workpieces, in particular onto cylindrical workpieces, wherein the O-rings are delivered via a delivery device with the annular faces of the O-rings lying in a defined plane, the improvement which comprises a spreader tool which has at least three spreader elements each spreader element forming a first contact surface for the inner surface of an O-ring; the first contact surfaces being disposed such that they are distributed about a first axis extending perpendicular to said plane and are movable radially outwardly from a standby position at a slight distance from said axis into an operating position at a greater distance form said axis; a transfer tool provided with a receiver element which can be pushed onto the workpiece and which is formed by a tubular member having a plurality of recesses at one end which are open towards said end and which are arranged to provide segments and recesses between each pair of adjacent segments at said one end, said segments being disposed about a second axis, said segments being formed as a wall section of a hollow cylinder, said segments, on their outer faces, each forming a second contact surface for the inner surface of an O-ring; the recesses being open towards the end of the receiver element, and the number of said recesses being equal to the number of the first contact surfaces formed by the spreader elements; the spreader tool and the transfer tool being operable to be moved from a first position in which the first and second axis lie on the same axis in relation to one another in the direction of said axes relative to one another to a second position in which each segment of the receiver element is disposed in the intermediate space formed between two adjacent first contact surfaces of the spreader elements located in the operating position; and a slide forming a third lateral contact surface for an O-ring displaceably disposed on the outer surface on the receiver element.

13. Apparatus according to claim 12, wherein the third contact surface extends transversely to the second axis.

14. Apparatus according to claim 12, wherein the recesses of the receiver element are slots.

15. Apparatus according to claim 12, wherein the spreader elements are each spreader arms which are mounted on a support element so as to pivot about a pivot-axis which is disposed perpendicular to the first axis and perpendicular to a line extending radially with respect to the first axis.

16. Apparatus according to claim 15, wherein the spreader arms are each formed as a double-ended lever having two lengths extending from said pivot-axis, with each double-ended lever forming with the outer face at the end of one length the first contact surface.

17. Apparatus according to claim 16, wherein the other length of each spreader arm co-operates with an element provided with a cam for obtaining the pivot movement of the spreader arm.

18. Apparatus according to claim 17, wherein the element forming said cam is a casing in which the support element is displaceably disposed and which has an area with a larger cross-section and an area with a smaller cross-section.

19. Apparatus according to claim 12, wherein the third contact surface is formed as an annular surface projecting radially outwards beyond the outer surface of the receiver element such that the radially inwardly lying area of this surface is closer to the end of the receiver element than the radially outwardly lying area.

20. Apparatus according to claim 19, wherein the third contact surface is a conically shaped surface.

* * * * *